United States Patent [19]
Stockel et al.

[11] 3,729,516
[45] Apr. 24, 1973

[54] PROCESS FOR TRIS (HYDROXYMETHYL) PHOSPHINE

[75] Inventors: Richard Frederick Stockel; William Frank Herbes, both of Bridgewater Township, Somerset County, N.J.

[73] Assignee: American Cyanamid Company, Stamford, Conn.

[22] Filed: Nov. 27, 1970

[21] Appl. No.: 93,402

[52] U.S. Cl. ............................................ 260/606.5 P
[51] Int. Cl. .................................................. C07f 9/50
[58] Field of Search ................................. 260/606.5 P

[56] References Cited

UNITED STATES PATENTS 3,030,421   4/1962   Renter et al. .................... 260/606.5 P Primary Examiner—Tobias E. Levow
Assistant Examiner—W. F. W. Bellamy
Attorney—Charles Joseph Fickey

[57] ABSTRACT

Production of tris(hydroxymethyl) phosphine of high purity and substantially free of water. Phosphine is reacted with about 3 moles of formaldehyde in the presence of a solvent which is a low molecular weight aliphatic alcohol of from one to three carbon atoms, at elevated temperature and pressure.

4 Claims, No Drawings

PROCESS FOR TRIS (HYDROXYMETHYL) PHOSPHINE

This invention relates to an improved process for producing tris(hydroxymethyl)phosphine. More particularly, it relates to the use of a low molecular weight aliphatic alcohol as the solvent medium in the reaction of formaldehyde with phosphine.

Tris(hydroxymethyl)phosphine is an important chemical of use in flame retardant compositions for textiles and plastics. It is also an intermediate in the preparation of other phosphorus-containing compounds, many of which are flame retardants. Tris(hydroxymethyl)phosphine is also useful as an oil additive and pest-control agent.

Prior art processes for tris(hydroxymethyl)phosphine give undesirable byproducts and/or are uneconomical. For example, the reaction of phosphine with aqueous formaldehyde provides tris(hydroxymethyl)phosphine oxide, hemiacetals and secondary phosphines.

In our copending application Ser. No. 93,404, filed Nov. 27, 1970, is described the use of a high boiling, water-immiscible organic solvent as the reaction medium in the reaction of paraformaldehyde with phosphine. Tris(hydroxymethyl)phosphine is produced in high yield with good purity. Little or no by-products are formed. However, certain agitation problems are encountered in the process of the copending application, particularly in large scale operations. There is a tendency for the product to be gummy and form large lumps and balls which interfere with the stirring.

It has now been discovered that when phosphine and formaldehyde are reacted in a low molecular weight aliphatic alcohol, a high yield of essentially pure tris(hydroxymethyl)-phosphine is produced. There are no appreciable amounts of side reactions to form undesirable byproducts. A clear, white to slightly yellow alcoholic solution of tris(hydroxymethyl)-phosphine is obtained which can be used as such in further processing, or the tris(hydroxymethyl)phosphine can be isolated, for example by distillation.

In the process of this invention, the low molecular weight aliphatic alcohol has from one to three carbon atoms, and may be methanol, ethanol, n-propanol or ispropanol. The preferred alcohol is methanol. Since water causes the formation of byproducts, it is desirable to use anhydrous alcohols.

The formaldehyde may be in the form of gaseous formaldehyde, paraformaldehyde, trioxane or mixtures thereof. Paraformaldehyde is preferred.

The reaction is carried out under pressure with agitation, preferably in a pressure vessel which can provide good mixing of the reactants. A reaction temperature between 60° and 100°C., preferably between 70° and 95°C., is employed. When a temperature above 110°C. is employed, it has been found that by-products are produced, the amounts becoming significant above 125°C. Temperatures below 60°C. are impractical. A pressure above 300 psig, preferably between 300 and 800 psig, is used.

The reaction in theory requires the us of three moles of formaldehyde per mole of phosphine, and that amount, or a very slight excess or deficiency, of formaldehyde is employed.

Sufficient alcohol should be used to provide a freely stirrable slurry or suspension of paraformaldehyde or trioxane in the solvent. The amount of alcohol will generally be between 30 and 60 percent based on the combined weight of alcohol formaldehyde. Solutions of formaldehyde in an alcohol, such as a commercial solution of formaldehyde in methanol (called "Formacel") Formacel") containing 55 percent of formaldehyde, can be used.

In a preferred procedure for carrying out the reaction, an autoclave containing a suspension of paraformaldehyde in methanol, about 0.9 part of methanol per part of formaldehyde, is purged with nitrogen to remove all air and the autoclave is heated to 75°–80°C. Phosphine is introduced over 1–3 hours at an autoclave pressure of 300–600 psig. A reaction temperature of 75°–90C. is maintained. When phosphine no longer reacts and approximately the theoretical amount of phosphine has been introduced into the autoclave, the autoclave is cooled to about 50°C., vented and purged with nitrogen. A clear, white to slightly yellow solution of essentially pure tris(hydroxy-methyl)phosphine in methanol is obtained. The tris(hydroxy-methyl)phosphine content is about 55 percent of the weight of the solution.

EXAMPLE

1

An autoclave was charged with 690 ml of methanol and 600 g of paraformaldehyde (91 percent real formaldehyde), and the autoclave was purged with nitrogen. The charge was stirred and heated to 75°C., and 280 g phosphine was introduced into the autoclave over about 3 hours while maintaining a temperature of 75°–90C. and a pressure of 450–475 psig. The autoclave was cooled and purged with nitrogen. The product was a nearly colorless methanol solution of essentially pure tris(hydroxymethyl)phosphine. The yield of tris(hydroxymethyl)-phosphine was essentially quantitative.

Chilling of the methanolic solution causes crystallization of the tris(hydroxymethyl)phosphine.

We claim:

1. A process for producing tris-(hydroxymethyl)phosphine in substantially quantitative yield comprising reacting phosphine with formaldehyde in a low molecular weight aliphatic alcohol at a temperature of about 60° to 110°C. and a pressure of about 300 to 800 psig.

2. The process of claim 1 wherein the alcohol has from one to three carbon atoms.

3. The process of claim 2 wherein the alcohol is methanol.

4. The process of claim 1 wherein the formaldehyde is in the form of paraformaldehyde.

* * * * *